March 1, 1932.  E. T. BURTON  1,847,079

WAVE MODULATION AND APPLICATION THEREOF

Filed Dec. 21, 1926  3 Sheets-Sheet 1

Inventor:
Everett T. Burton.
by  E. V. Griggs
Attorney.

Inventor:
Everett T. Burton.
by E. V. Griggs
Attorney.

Inventor:
Everett T. Burton.
by E. V. Griggs
Attorney.

Patented Mar. 1, 1932

1,847,079

UNITED STATES PATENT OFFICE

EVERETT T. BURTON, OF JACKSON HEIGHTS, NEW YORK, ASSIGNOR TO WESTERN ELECTRIC COMPANY, INCORPORATED, OF NEW YORK, N. Y., A CORPORATION OF NEW YORK

WAVE MODULATION AND APPLICATION THEREOF

Application filed December 21, 1926. Serial No. 156,093.

This invention relates to generation and control of waves, and especially to modulation and amplification of electrical variations and generation of sustained electrical oscillations.

According to this invention, undesired coupling between the input circuits of a high order magnetic modulator is avoided by having the magnetomotive forces produced by the carrier and signal opposed to each other in one portion of the magnetic circuit while in another portion of the circuit they aid each other.

The invention also contemplates a system which amplifies variations by first modulating them with a carrier wave in a high order magnetic modulator, to obtain in the modulator core a flux which is of frequency high relative to the impressed carrier frequency and induces in the modulator output winding a voltage proportional to the frequency of the flux, and then demodulating the voltage wave to produce an amplified form of the variations.

Furthermore, the system is arranged to generate self sustained oscillations by a feedback circuit which causes the amplified variations to augment the variations which are to be amplified or made self sustaining.

Other features of the invention will be apparent from the following description and claims.

A U. S. patent to Eugene Peterson, No. 1,678,163, issued July 24, 1928, entitled "Modulation", claims methods, and means such as for example, magnetic modulators, for producing modulation and demodulation of order higher than the second.

The term modulation, as used herein, relates to distortion of waves, and especially to phenomena which occur when two electric waves, for example, a so-called carrier wave and a so-called modulating wave, are jointly impressed upon a distorting instrumentality.

It is well known that modulation of this kind yields side frequencies made up of various combinations involving the frequencies of the impressed waves. When one of the waves, either the modulating or carrier wave, consists of a band of frequencies the side frequencies likewise assume the form of bands.

The number, amplitude, and frequency characteristics of these side bands is a function of the kind and extent of the distortion as measured, for example, by the equation of the characteristic curve which expresses the relation between the amplitude of the input and output quantities.

In most present systems, use is made of the "square" characteristic of this curve, that is, the characteristic which makes the equation of the curve approach the form $y=kx^2$, in which $x$ and $y$ are respectively the amplitudes of the input and output quantities. Other terms having other powers of $x$ may, to some extent, be present. Those in other even powers of $x$ will contribute to the effect secured by the square term as will be explained later. On account of this "square" characteristic, modulation yields side band components having frequencies equal respectively to the sum and difference of the frequencies of the modulating and carrier waves. These side bands with or without some of the original carrier constitute a modulated carrier wave from which the modulating component may be reproduced at a receiving station by a similar distortion.

The terms besides the "square" term, if present, in addition to contributing to the effect of the "square" term, as above, produce other side bands in which harmonics of the carrier or modulating frequencies, or both, instead of the fundamental frequencies, occur. These various combination frequency components or side bands are distinguished from each other by what may be called their order, or the number of times the carrier and modulating frequencies, taken together, occur. This distinction is made use of in defining the order of modulation which produces these components. For example, second order modulation produces second order side bands or side bands of the kind usually employed heretofore, in which the carrier and modulating frequencies each occurs once, third order modulation results in third order side bands or side bands in which the first even harmonic of either the carrier or modulating frequency occurs, etc.

Modulation of order higher than the second may be conveniently designated higher order modulation, or high order modulation; and side bands of higher order than the second may be designated higher order or high order side bands.

Pronounced higher order side bands can be produced by modulating means which produce, and operate over, a characteristic curve which has one or more pronounced bends. Where, as is frequently the case, it is desirable that odd order side bands be obtained to the exclusion of the even order side bands, the curve should have two symmetrical bends in relatively opposite directions, that is the curve should have opposite symmetry about each of the axes of coordinates through a point on the curve, and the operation should occur equally over the curve in both directions from this point about which the curve is symmetrical. If the operation does not occur about the point of symmetry or if the curve lacks symmetry of this kind even order side bands will be present. In general for either case the degree of acuteness of the bends indicates proportionately the amplitudes of the side bands.

Modulation producing pronounced odd order side bands to the substantial exclusion of even order side bands can be effected by subjecting a closed magnetic path designed for saturation at small magnetizing forces to joint magnetizing action of a carrier magnetomotive force wave and a modulating magnetomotive force wave. These magnetomotive forces can be obtained by sending a carrier current and a modulating current through the same or different magnetizing windings for the path. The path can be, for example, a ring-shaped core for the winding or windings. The winding or windings, or another winding on the core, can deliver modulated current. The modulator may be regarded as accomplishing its function by varying the flux density in the core, and therefore the impedance or the mutual inductance of the carrier current and side band current windings, as a non-linear function of the modulating current. Such a magnetic core modulator when operating symmetrically about a point on its characteristic curve suppresses the even harmonics of the impressed carrier frequency as well as the even order side bands.

If currents of different frequencies $p$ and $q$ are fed into a distorting (modulating) device, there results a complex current in which, as indicated by a mathematical analysis given presently, the frequency of each current component can be represented by the general expression $mp \pm nq$, in which $m$ and $n$ may have any or all integral values, or zero values, and in which the symbol $\pm$ indicates that the sum, the difference, or both the sum and difference, of the two quantities may be present.

When either of the coefficients $m$ or $n$ has zero value, the frequency defined by this expression is that of a direct current if the other coefficient is zero. If the other coefficient is not zero, the current component has a frequency $p$ or $q$, as the case may be, or a harmonic of $p$ or $q$. When neither of the coefficients has zero value there are obtained combination-frequency components of current, that is, side frequencies. The order of modulation is conveniently given as the sum of $m$ and $n$. When both $m$ and $n$ are unity, we have the familiar case of second order modulation in which the side frequencies are $p \pm q$. Third order modulation may be correspondingly represented by $2p \pm q$ or $p \pm 2q$. There are accordingly four possible third order side frequencies. If $r$ is a number expressing the order of modulation (that is, a number which is the sum of two numbers) it is evident that there are $r-1$ combinations of integral numbers (other than zero) which add up to equal $r$, so that, considering both the sum and difference frequencies, there may be a maximum of $2(r-1)$ different side frequencies for each of the respective orders of modulation.

In what follows, it will be assumed that $q$ represents a band of frequencies as, for example, a voice current (the so-called modulating current) and that $p$ represents a fixed carrier frequency having a value greater than the greatest value of $q$. The expression "side band" will accordingly be used rather than "side frequency". Also, only the side bands in which $q$ occurs but once, that is, those having frequencies $p \pm q$, $2p \pm q$, $3p \pm q$, etc., will be considered, since only by the transmission of side bands of this type can the modulated component be reproduced at the receiver by modulating such side bands with a wave having the frequency of the unmodulated carrier or a harmonic thereof.

In order to show how various multiple order side bands occur and to determine the extent to which they occur, an extension of the method of analysis used in U. S. patent to Carson, Serial No. 1,449,382, issued March 27, 1923, is given below, substantially as presented in the above mentioned Peterson patent.

According to that method a statement of the current (or potential) resulting from modulation is obtained by substituting in the general equation of the type $y = ax + bx^2 + cx^3$ values of the simultaneously impressed currents (or potentials). Suppose that the input currents are $P \cos p_1 t$ and $Q \cos q_1 t$, in which $p_1$ and $q_1$ equal respectively $2\pi p$ and $2\pi q$, so that $x$ equals $P \cos p_1 t + Q \cos q_1 t$. (No material change would result if an initial phase angle between the two impressed waves were assumed.)

This value of $x$ should be substituted in the general equation just given. The first term $ax$ yields merely amplified waves of the impressed frequencies $p$ and $q$. The term $bx^2$ yields waves of frequencies $2p$, $2q$, and $p \pm q$, as is well known. The second order side bands $p \pm q$ result from the trigonometric expansion of the product $bPQ \cos p_1 t \cos q_1 t$. The harmonic frequencies $2p$ and $2q$ result from trigonometric expansions of, respectively, $bP^2 \cos^2 p_1 t$ and $bQ^2 \cos^2 q_1 t$.

If each of the remaining terms of the general equation is algebraically expanded by the binomial theorem, it will be found that the expanded equation comprises terms in powers of $\cos p_1 t$ and $\cos q_1 t$, and terms which contain the product $\cos p_1 t \cos q_2 t$ as a factor. The first two yield waves whose frequencies are, respectively, harmonics of $p$ and $q$. The last yields combination frequency waves, that is, side bands.

Considering these terms which produce combination frequency waves it will be found that alternate terms beginning with the second in the expansion of even power terms of the general equation are of this type and are further characterized in that the exponents of $\cos p_1 t$ and $\cos q_1 t$ are each odd. These terms in their regular order, up to and including the expansion of the sixth power term of the general equation, are as follows, only those coefficients which are necessary in this discussion being retained:

$$\begin{array}{l} PQ \cos p_1 t \cos q_1 t \\ P^3 Q \cos^3 p_1 t \cos q_1 t \\ PQ^3 \cos p_1 t \cos^3 q_1 t \\ P^5 Q \cos^5 p_1 t \cos q_1 t \\ P^3 Q^3 \cos^3 p_1 t \cos^3 q_1 t \\ PQ^5 \cos p_1 t \cos^5 q_1 t \end{array} \quad (1)$$

The frequency determining quantities in these terms are each in the form $\cos p_1 t \cos q_1 t$ or this quantity times one or more cosine squared quantities. Since $\cos^2 \alpha = \frac{1}{2} + \frac{1}{2} \cos 2\alpha$ the development of these quantities each contains one term of the form of $\frac{1}{2} \cos p_1 t \cos q_1 t$. This demonstrates that the terms of (1) each yields a pair of second order side bands. These side bands for the several terms are superposed to comprise resultant side bands.

The amplitude of each of the resultant upper and lower side bands may accordingly be expressed as a series the terms of which are proportional to $PQ$, $P^3Q$, $P^5Q$, $PQ^3$, $PQ^5$, $P^3Q^3$—all being products of even order.

These terms will be multiplied by the coefficients $b$, $d$, $f$, etc., of the general equation. In general these coefficients decrease in magnitude as the power of the terms of the general equation increases, that is, as the order of the above products increases. In fact the characteristic curve may be caused to be substantially "square" so that substantially only the term $PQ$, which is linear in $Q$, is present. For other cases the other terms will be present in relatively small amounts and will introduce some distortion on account of non-linearity of certain of the coefficients in $Q$. However, a number of the terms as $PQ$, $P^3Q$, $P^5Q$, etc., hence their sum, will be linear in $Q$. The magnitude of the distorting terms, that is, $PQ^3$, $PQ^5$, $P^3Q^3$, etc., may be minimized by making $P$ large as compared with $Q$, so that substantial linearity may be obtained, as is necessary for distortionless transmission. This is true even though the characteristic curve departs widely from its "square" configuration.

It can be shown, in a manner similar to the above, that other side bands of a different even order may be obtained from other terms than those indicated in (1), in the expansion of the even power terms of the general equation. However, as will be more evident later, only those of the form $mp \pm q$ will have coefficients which are linear in $Q$ and, therefore, useful.

From the odd power terms of the general equation odd order side bands may be similarly obtained. This will be demonstrated for the case of third order side bands.

From the expansion of these odd power terms (except the linear term) it will be found that alternate terms beginning with the second have even powers of $\cos p_1 t$ and odd powers of $\cos q_1 t$. These terms in their regular order, up to and including those for the seventh power term of the general equation, are as follows, retaining only the necessary coefficients:

$$\begin{array}{l} P^2 Q \cos^2 p_1 t \cos q_1 t \\ P^4 Q \cos^4 p_1 t \cos q_1 t \\ P^2 Q^3 \cos^2 p_1 t \cos^3 q_1 t \\ P^6 Q \cos^6 p_1 t \cos q_1 t \\ P^4 Q^3 \cos^4 p_1 t \cos^3 q_1 t \\ P^2 Q^5 \cos^2 p_1 t \cos^5 q_1 t \end{array} \quad (2)$$

The frequency determining quantities in these terms are each of the form $\cos^2 p_1 t$, $\cos q_1 t$ or this quantity times one or more $\cos^2$ quantities.

Since $\cos^2 \alpha = 1/2 + 1/2 \cos 2\alpha$, the development of the expression $\cos^2 p_1 t \cos q_1 t$, contains the term $1/2 \cos^2 p_1 t \cos q_1 t$. The product of this term with the development of the remaining cosine squared quantities results in a term made up of the product of this term and $1/2$. Accordingly, the development of each of the terms in (2) contains a term of the form $\cos^2 p_1 t \cos q_1 t$. This form is similar to the form $\cos p_1 t \cos q_1 t$ and in an analogous manner yields upper and lower side bands of $2p$. This demonstrates that the terms in (2) each denotes a pair of third order side bands of the type $2p \pm q$.

The amplitudes of each of the resultant upper and lower side bands may accordingly be expressed as a series, the terms of which are proportional to $P^2Q$, $P^4Q$, $P^6Q$, $P^2Q^3$, $P^4Q^3$, $P^2Q^5$. The sum of these terms is linear under the conditions discussed above for second order modulation. That is, when there is only the third power term in the general equation, only the first term of the series occurs and the side bands are strictly linear in $Q$, and when there are additional terms, there is a slight distortion which can be greatly minimized by properly proportioning the values of P and Q.

It may be shown in a similar manner that third order side bands of the type $p \pm 2q$ may be obtained from other terms than those indicated under (2), of the development of the odd power terms of the general equation. The quantities expressing the amplitude of these side bands are made up of terms none of which is linear in Q, so that the sum is not linear and cannot be made linear in Q. This means that third order modulation of this type cannot yield a faithful reproduction of the signal. The same thing is true of other higher orders of modulation, even or odd, in which $n$ is greater than one. These side bands may, however, be used in signaling where accurate reproduction of the modulating wave is not essential.

Side bands of a higher odd order than third of the type $mp \pm q$ can also be obtained from the odd power terms of the general equation. These side bands, as well as the higher even order side bands of the same type, can be made substantially linear in Q.

Although telephone systems now in use depend upon second order modulation and demodulation experience has shown that certain higher orders, especially the third, are suitable for the production of side bands and for the reproduction of speech. As illustrating the practicability of using the higher orders of modulation it was recently found that in an actual carrier current telephone system arranged for optimum second order modulation conditions and for the transmission of the unmodulated carrier component, the amplitude of the third order side bands could, by adjustments not affecting the conditions of second order modulation, be made of the same order of magnitude as that of the second.

It is apparent that the term "carrier frequency" must be re-defined for use in describing systems of modulation of higher order than the second. For example, a third order side band having frequencies $2p \pm q$, can be demodulated to reproduce a signal by either second or third order demodulation, depending upon whether a current of frequency $2p$ or $p$ is available. Accordingly, depending on the order of demodulation, either of these two frequencies may play the rôle played by the carrier frequency in a system using second order modulation (and accordingly second order demodulation). In this specification the terms "carrier current" and "carrier wave" will be applied to any current or wave that may be combined in a distorting device with the transmitted side band or side bands to produce a signal, and the frequency of such current or wave will accordingly be designated a carrier frequency. A modulated wave of a high order may accordingly have as carrier frequencies both the frequencies of the impressed high frequency wave and certain of its harmonics. The impressed high frequency wave will be designated as the "impressed" "original" or "unmodulated" carrier wave.

Figure 1:
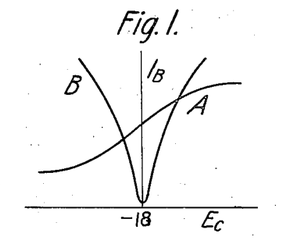
Figs. 1 and 3 are curves for facilitating explanation of the invention.

Conditions favorable to the production of second order side bands are not necessarily favorable to the production of third order side bands or, generally, the conditions favorable to even order modulation are not necessarily favorable to odd order modulation, and vice versa. This is illustrated by Fig. 1 in which A and B are, respectively, the $E_c - I_b$ characteristic curve and the curve of the second order side band output current of a modulator recently tested. The modulator circuit was of the general type illustrated in U. S. patent to Van der Bijl, No. 1,350,752, issued August 24, 1920. A tungsten filament carrying a current of 1.35 amperes was used. The plate potential was 220 volts. The important thing to notice about this figure is that when the grid is given a polarizing potential of $-18$ volts, the second order side band becomes substantially zero. This value of grid potential marks a point of symmetry of the characteristic curve. This condition, which is unusual and difficult to obtain with oxide coated filaments, was made possible by reason of the choice of filament material and the critical values of the constants used. The other even order side bands would also be found to be substantially zero if modulation occurred about the same point. Although the odd order side band output is not shown in the curve, it is not a minimum at that point.

The experiment demonstrates that if a characteristic curve having symmetry about a point is represented by a power series, this series will have no even power terms, that is, the coefficients $b, d, f$, etc., of the general equation will each have zero values.

Although it is not necessary, in order to produce odd order side bands, to operate about a point of symmetry, such method of operation makes possible odd order modulation with suppression of even harmonics of the impressed carrier frequency and with suppression of even order side bands since these components result from the terms in the general equation having the same exponents as the numbers indicating the frequency multiple. This expedient is of value in its economy of energy.

Figure 2:
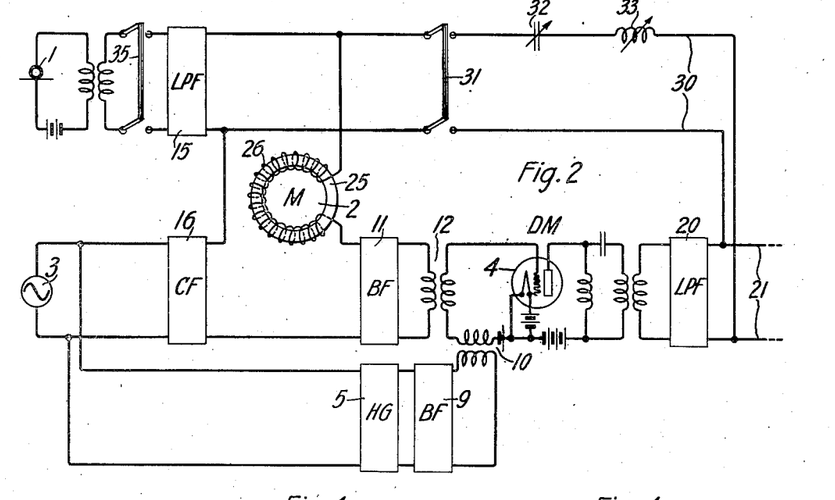
Fig. 2 is a circuit diagram of a system employing a high order magnetic modulator in amplifying variations and in generating sustained oscillations.

In Fig. 2 speech waves from a telephone transmitter 1 are amplified by employing them to modulate a relatively high frequency or carrier wave from a carrier wave source 3 by high order magnetic modulation, as for example third order modulation, in a magnetic modulator 2 and demodulating one or both of the resulting third order side bands by second order demodulation in a second order demodulator 4. The demodulator 4 is shown as an electric space discharge tube demodulator but may be of any suitable type, as for example a crystal rectifier. Moreover, although the system of Fig. 2 is shown as employing second order demodulation, it might instead employ third order demodulation, accomplished in any suitable third order modulator (this term being used broadly to include "demodulator"), as for example the modulator described above as having the characteristic curve A of Fig. 1, or a modulator similar in general to any of the third order modulators disclosed in the above mentioned Peterson patent, or to the modulator 2. A harmonic generator 5 fed by source 3 supplies to the input circuit of demodulator 4, through a narrow band filter 9 and a transformer 10, a wave of double the frequency of source 3, that is, a wave of double the original or fundamental carrier frequency, for accomplishing the second order demodulation of the third order side band or side bands generated in modulator 2 and transmitted through a band filter 11 and a transformer 12 to the input circuit of demodulator 4. A low pass filter 15, passing the speech frequencies from transmitter 1, is interposed between the transmitter 1 and the modulator 2. A narrow band filter 16, passing the original or fundamental carrier frequency, is interposed between source 3 and modulator 2. A low pass filter 20, passing the amplified speech waves delivered by demodulator 4, is interposed between the output circuit of the demodulator and a circuit 21 which utilizes the amplified speech waves. The harmonic generator 5 may be, for example, of the type disclosed in the paper by Colpitts and Blackwell on Carrier current telephony and telegraphy, Journal of the American Institute of Electrical Engineers, vol. 40, page 205. The filters 9, 11, 15, 16 and 20 may be, for example, of appropriate types disclosed in U. S. patent to Campbell No. 1,227,113, May 22, 1917. The demodulator 4 is shown as of the type disclosed in the above mentioned patent to Van der Bijl.

The modulator 2 consists of a magnetic ring 25 wound with a single coil 26, and modulation is effected by varying the inductance of the coil by correspondingly variably saturating its magnetic core. The modulator distorts the currents flowing through the coil so that third order side bands, one at least for transmission through filter 11 to demodulator 4, are produced when carrier current is supplied to the modulator through filter 16 and telephonic current is supplied to the modulator, from transmitter 1, through filter 15. The modulator suppresses even order side bands and also suppresses even harmonics of the impressed carrier frequency, including the first even harmonic.

Figure 3:
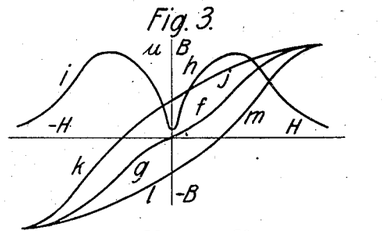

The mode in which modulator 2 accomplishes modulation will now be explained by reference to Fig. 3. The curves $f$ and $g$ in this figure are the familiar B—H, or magnetization curves which express the relation between the magnetizing force H and magnetic induction B. Curve $f$ is the magnetization curve for positive variations of H which would be obtained if a magnetic core, as, for example, the core of the magnetic modulator, having no initial residual magnetization, were variably magnetized by positive values of current. The curve $g$ would be similarly obtained if negative values of magnetomotive force were used. Curves $f$ and $g$, taken together, exhibit perfect symmetry about the origin. The permeability of the core is measured by the ratio of B and H, that is, by the slope of the chords of the magnetization curve between the origin and the reference points. The curves which express the absolute values of permeability corresponding to curves $f$ and $g$ have approximately the shape respectively of curves $h$ and $i$, which obviously must be symmetrical about the axis of ordinates. Since the permeability is a factor in the equation which expresses the inductance of the magnetizing winding, the inductance varies in accordance with these curves $h$ and $i$. If the variable saturation of the toroidal core with variable positive and negative values of impressed potentials is assumed to follow these curves $h$ and $i$, the characteristic curve between the impressed potentials and current flowing through the coil would be obtained by dividing these positive and negative values of impressed potentials by the ordinates of $h$ and $i$. The resultant characteristic curve would correspond, for example, to the characteristic curve A of Fig. 1, and would determine the modulating properties of the circuit. The curve would obviously have symmetry of the same type as that of curve $f g$, that is, it will have symmetry about a point. Accordingly, under the assumed conditions odd order modulation would be achieved with suppression of the even order side bands and of even power harmonics of the impressed carrier frequency. This result is achieved without the use of a polarizing means.

As a practical matter, the variation of B under conditions assumed above of variable H would, starting at the top of the positive magnetization curve, follow the familiar hysteresis loop $j, k, l, m$, in which the ascending and descending branches $m$ and $k$, and correspondingly the branches $j$ and $l$, are symmetrical with each other. Although the presence of residual magnetization affects the shape of the corresponding permeability curves, they are, as a matter of fact, of the same general form as $h$ and $i$, and the symmetry of the loop insures that these permeability curves are symmetrical. Accordingly, the operation of the magnetic core modulator, even when there is hysteresis, has the desirable features of odd order modulation with suppression of the even order effects.

Of course, the hysteresis loop disclosed would result only if the magnetizing current has not more than one maximum and minimum per cycle, as for example, a sine wave current. In the actual case the magnetizing current consists of superposed carrier and modulating current, and the resulting wave form accordingly has numerous irregularities and reversals of slope. For this case the hysteresis loop disclosed illustrates, for example, only the uniformly recurrent loop corresponding to the carrier current. The irregularities due to the modulating current would properly be shown as both large and small hysteresis loops having their origins in the loop disclosed.

It is desirable to use a core which saturates at a small value of magnetizing current so that the characteristic curve has pronounced bends at its two extremes, and accordingly so that there are more pronounced high order modulation effects. From another point of view, the use of a saturated core makes possible the production of high order effects with the small values of impressed potential that for practical reasons must often be used.

Although in the above the effect of variation of inductance has been described, the corresponding variation of effective resistance contributes, although usually to a smaller extent, to the result, so that the effect may be considered broadly as a variation of impedance.

In practice, it has been found that the use of an alloy metal known as "permalloy" for the core markedly improves the operation of the device. Reference is made to a paper by Arnold and Elmen in the Journal of the Franklin Institute for May, 1923, and to U. S. Patents to G. W. Elmen Nos. 1,586,883 and 1,586,884, June 1, 1926, for descriptions of this alloy and its properties.

Returning to Fig. 2, the filter 11 selects, say, the upper third order side band produced in modulator 2, and transmits it to the demodulator. If third order demodulation be employed, then by having filter 11 pass the original or fundamental carrier frequency as well as one or both of the third order side bands, the demodulating wave of the original carrier frequency required for third order demodulation can be supplied to the demodulator from the modulator.

With second order demodulation of the system, double the fundamental carrier frequency is supplied to the demodulator through filter 9 and a third order speech side band of the carrier current of the pass frequency of filter 16 is supplied to the demodulator, from the modulator, through filter 11. The demodulator produces speech currents of the form sent to the modulator by transmitter 1, and transmits them through filter 20 to line 21. The energy of the third order side band delivered by the modulator 2, and consequently the speech current energy delivered by the demodulator, can be much greater than that delivered to the modulator, since the ratio of the third order side band voltage across the modulator coil to the speech frequency voltage across the coil is proportional to the ratio of the time rate of change of the third order side band flux in the coil to the time rate of change of the speech frequency flux in the coil and the time rate of change of each flux is proportional to the frequency of the flux. In the case of a third order side band the side band frequency is of the order of twice the magnitude that would obtain for a second order side band of the same original carrier frequency. In designing the system it should be borne in mind that the energy obtained from the side band voltage depends upon the impedance into which the voltage works, as well as upon the magnitude of the voltage. The energy supply necessary for that energy amplification of variations sent from transmitter 1 which is due to the action of modulator 2, is obtained from the carrier wave supplied to modulator 2 from the carrier wave source 3.

Although the drawings show only one stage of amplification of a wave by employing the wave to modulate a carrier wave in a high order magnetic modulator and demodulating a resulting modulated wave to obtain an amplified form of the original modulating wave, any desired number of such stages may be employed in cascade relationship.

Fig. 2 also shows a feed back circuit or connection 30 for feeding the amplified wave from the output circuit of the amplifier back to the low frequency input terminals of the amplifier. These low frequency input terminals of the amplifier are the output terminals of filter 15.

When it is desired that the feed back circuit augment the amplifying power of the amplifier, as for instance for regenerative amplification of a note or tone transmitted to the amplifier from transmitter 1 through filter 15, a switch 31 is closed, to render the feed back connection 30 operative. The frequency at which this connection is most effective in increasing the amplifying power of the amplifier depends largely upon the filters 11 and 20. Amplification of a given frequency can occur only if filter 11 passes a side frequency obtained by combining the given frequency with a carrier frequency from a wave source such as 3, in modulator 2. Moreover these filters affect amplification of a given frequency by virtue of the fact that the phase angle between a harmonically varying quantity of given frequency at the input of such a filter and the same quantity at the output of the filter depends upon the number of sections in the filter and upon the position of the given frequency in the pass range of the filter, since the angular phase shift per section which such a filter produces in a harmonically varying quantity varies from zero for the lower limiting frequency of the pass range of the filter to 180° for the upper limiting frequency of the pass range. By varying the reactance of a reactance network, represented by way of example as a variable condenser 32 and a variable inductance 33, in the feed back connection, the degree of amplification of a wave of given frequency can be adjusted.

By opening a switch 35 in the circuit between transmitter 1 and filter 15, and closing switch 31, the amplifier can be converted into an oscillator generating sustained oscillations, the frequency of oscillation being determined largely by filters 11 and 20 which affect the feed back as described above for the amplifier. By adjusting the reactances 32 and 33 the feed back can be controlled to produce the maximum regeneration and the maximum strength of oscillations. The oscillations generated can be utilized in circuit 21. The relatively high frequency source 3 supplies energy for the amplification due to the action of modulator 2 and is necessary for the generation of the relatively low frequency oscillations fed to circuit 21.

Figure 4:
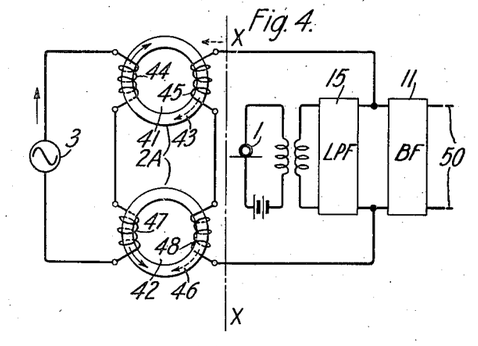
Fig. 4 shows diagrammatically a high order balanced magnetic modulator with its associated carrier, modulating and modulated current circuits.

Fig. 4 shows a balanced third order magnetic modulator 2A comprising two magnetic modulators 41 and 42 such as the modulator 2 of Fig. 2. Modulator 41 comprises a ring-shaped magnetic core 43 having a carrier current winding 44 and a modulating current and modulated current winding 45. Modulator 42 comprises a ring-shaped magnetic core 46 having a carrier current winding 47 and a modulating current and modulated current winding 48. Carrier current or current to be controlled or modulated is supplied to windings 44 and 47, in series, from a carrier wave source 3. Modulating current is supplied to windings 45 and 48, in series, from a modulating wave source shown by way of example as a telephone transmitter 1, through a low pass filter 15. The windings 45 and 48, in series, deliver modulated current to a carrier telephone line or other circuit 50, through a band filter 11. The relative poling or winding directions of the windings 44 and 45 on core 43 is opposite to that of the windings 47 and 48 on core 46.

Throughout the drawings, a dotted arrow placed on a magnetic circuit adjacent a winding indicates the direction (sense) of magnetic flux in the core due to the modulating current in the winding when the direction of the modulating current is as indicated by a dotted arrow beside the modulating current circuit containing the winding. Throughout the drawings, a solid arrow placed on a magnetic path adjacent a winding indicates the direction of magnetic flux in the core due to the carrier current in the winding when the direction of the carrier current is as indicated by a solid arrow beside the carrier current circuit containing the winding.

The E. M. F. directly induced in winding 45 by flux due to flow of carrier current in winding 44 is neutralized, as regards the circuit of windings 45 and 48, by the E. M. F. directly induced in winding 48 by flux due to flow of carrier current in winding 47. That is, no E. M. F. of the frequency of source 3 appears across the terminals of the circuit constituted by windings 45 and 48. Similarly, no E. M. F. corresponding to the wave supplied to windings 45 and 48 by transmitter 1, through filter 15, appears across the circuit constituted by windings 44 and 47. It will be clear that if, instead of having windings 45 and 48 deliver the modulated current to band filter 11, another winding like 45 be provided on core 43 and another winding like 48 be provided on core 46 and the input of filter 11 be connected to these two other windings in series, instead of to windings 45 and 48 and filter 15, the system will still operate to prevent undesired reaction between the carrier current source and the modulating current source and to prevent current of the frequency of source 3 from flowing though the output side of filter 15 or the input side of filter 11.

Figure 4A:
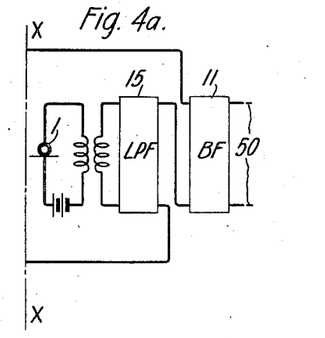
Fig. 4a shows a modification of the modulating and modulated current circuits associated with the modulator of Fig. 4.

A modification of the part of Fig. 4 to the right of line X—X is indicated in Fig. 4a and consists in connecting the output side of filter 15 and the input side of filter 11 in series with each other, instead of in parallel with each other, with respect to the circuit constituted by windings 45 and 48. It will be understood that in Fig. 4a the portion of the system lying to the left of line X—X and not shown is the same as the portion of Fig. 4 shown to the left of line X—X.

The fact that the balanced third order modulator 2A of Figs. 4 and 4a does not suppress the third order side bands of the type $2p+q$ but that the ones generated by modulator 41 add to, rather than oppose, those generated by modulator 42, can be seen from the demonstration above that the amplitudes of such third order side bands generated by each of the modulators 41 and 42 may be expressed as a series, the terms of which are proportional to $P^2Q$, $P^4Q$, $P^6Q$, $P^2Q^3$, $P^4Q^3$, $P^2Q^5$; for in each of these products, P occurs as a factor an even number of times and Q an odd number of times, and consequently each product will have the sign of Q regardless of the sign of P or in other words the phase of the third order side band generated in each modulator 41 and 42 is independent of the phase of the carrier in that modulator, and therefore the sum of the two series corresponding to the two modulators 41 and 42 is double the sum of either series alone.

Figure 5:
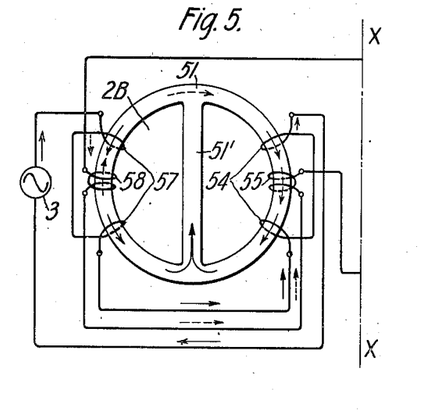
Fig. 5 shows diagrammatically another form of high order balanced magnetic modulator.

Fig. 5 shows how the modulators 41 and 42 can be combined into a single core modulator 2B comprising a ring-shaped magnetic core 51, carrier current windings 54 and 57 and modulating current windings 55 and 58, the windings 55 and 58 serving as modulated current windings also. The portion of the system lying to the right of line X—X and not shown in Fig. 5 may be the same as the portion of Fig. 4 or 4a to the right of line X—X. In Fig. 5 the carrier fluxes due to windings 54 and 57 oppose each other, with respect to the ring-shaped magnetic path 51, and consequently the carrier fluxes from windings 54 and 57 both pass (upwardly, as shown,) along the vertical diameter of the ring. If desired a magnetic path 51' either separate from or integral with the ring 51, may be provided for these fluxes. Although there are two (partly common) paths for the carrier fluxes, the modulating and modulated fluxes pass along only the ring-shaped magnetic path 51. The relation between the directions of the carrier and modulating fluxes in the right hand half of the path 51 is opposite to that between the carrier and modulating fluxes in the left hand half of the path. It will be seen that a balanced modulator of the general type of modulator 2B when provided with path 51', would result from coalescing the lower portion of ring 43 with the upper portion of ring 46, in Fig. 4. The operation of the modulator of Fig. 5 is similar to that of the modulator of Fig. 4, as will now be apparent from the description above of the operation of the modulator 2A.

Figure 6:
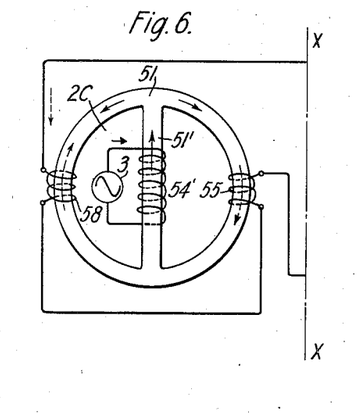
Fig. 6 is a diagrammatic showing of a modification of the modulator of Fig. 5.

The system of Fig. 6 is that of Fig. 5 modified in that the carrier current magnetizing winding turns for producing carrier flux in path 51 are turns 54' surrounding path 51', instead of turns 54 and 57 surrounding parts of path 51 as in Fig. 5. In Fig. 6 the modulator corresponding to the modulator 2B of Fig. 5 is designated 2C.

Figure 7:
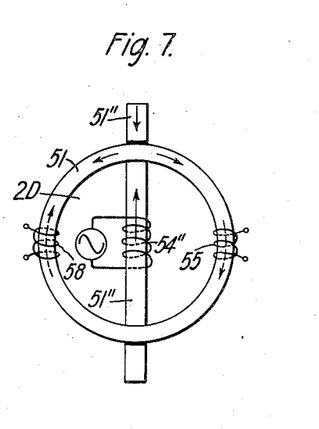
Figs. 7 and 8 are diagrammatic front and side elevations, respectively of a modified form of the modulator of Fig. 6, the side elevation being partly in cross section.
Figure 8:
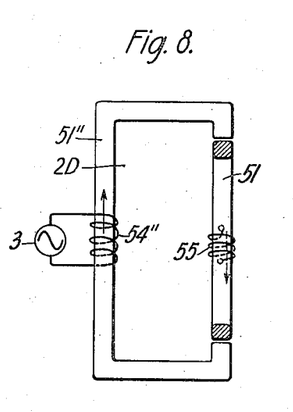

The balanced modulator 2D of Figs. 7 and 8 is a modification of the balanced modulator of Fig. 6 in that a magnetic return flux path 51″ for the carrier fluxes in ring 51 is provided by a yoke 51″ external to the ring 51 instead of by the bar 51' which lies along a diameter of the ring 51 in Fig. 6, and in that the carrier magnetomotive force for magnetizing the ring is obtained by a carrier current magnetizing winding 54″ on the yoke 51″ instead of by the winding 54' on bar 51' in Fig. 6. The windings of modulator 2D may be connected in circuit as are the corresponding windings of modulator 2C of Fig. 6.

The operation of the modulator of Fig. 6 and the operation of the modulator of Figs. 7 and 8 is similar to that of the modulator of Fig. 5, and will be apparent without further description.

It will be clear that, if desired, the modulator of Fig. 5, either with or without the path 51', may be provided with a magnetic yoke such as the yoke 51″ of Figs. 7 and 8, for reducing the reluctance of the carrier flux path.

Figure 9:
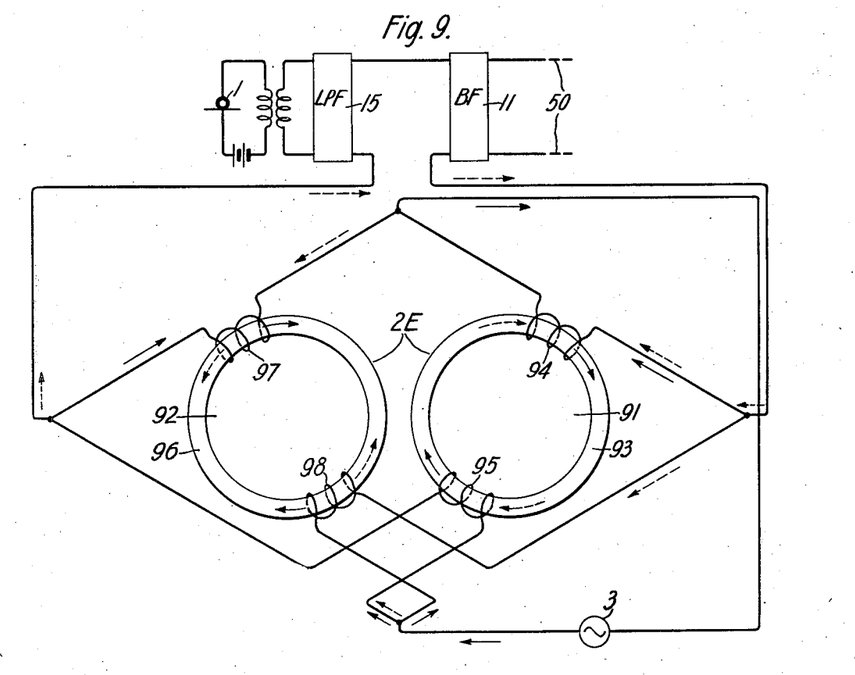
Figs. 9 and 10 show other forms of high order balanced magnetic modulators.

Fig. 9 shows a balanced third order magnetic modulating system which is like that of Fig. 4 as modified in accordance with Fig. 4a except that in Fig. 9 the balanced modulator 2E, comprising third order magnetic modulators 91 and 92 similar in general to the modulators 41 and 42 of Fig. 4, has its windings 94, 95, 97 and 98 arranged for connection as the four arms of a Wheatstone bridge circuit of which one diagonal is the source 3 and the other diagonal is the circuit including the output side of filter 15 and the input side of filter 11 in series. Thus the same windings serve as carrier current windings and as modulating current and modulated current windings, yet undesired reaction between the carrier current circuit and the modulating and modulated current circuit connected to the modulator is prevented, for the bridge is balanced, its windings all having the same number of turns. The relation between the directions of the carrier and modulating fluxes in one of the ring-shaped cores is opposite to that in the other ring-shaped core, as is the case with the modulator 2A of Fig. 4. In other words, when the carrier flux in core 93 is in the same direction as the modulating flux, the carrier flux in the core 96 is in the direction opposite to that of the modulating flux, and vice versa. As in the case of modulators 41 and 42, in each of modulators 91 and 92 the phase of the third order side band voltage generated is independent of the phase of the applied carrier current, and the third order side band voltage generated in one of two windings in series with each other in the modulated current circuit adds cumulatively to the third order side band generated in the other of the two windings, which are on different cores.

Figure 10:
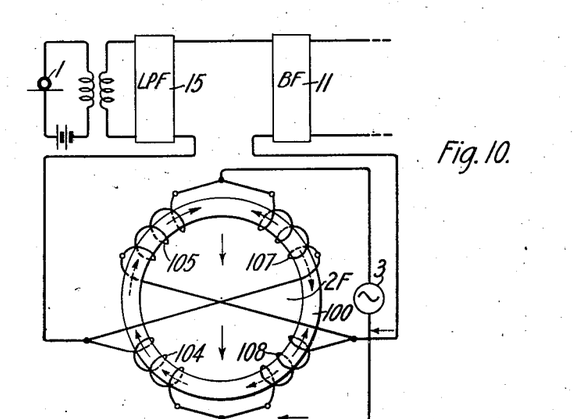

Fig. 10 shows a balanced third order magnetic modulating system like that of Fig. 9 except that the balanced modulator 2F has all of its windings, 104, 105, 107, and 108, on a single ring-shaped core 100. The carrier fluxes due to the windings on the left hand side of the core are in the same direction, which is opposite to that of the fluxes due to the windings on the right hand side of the core, and consequently all of the carrier flux passes (downwardly, as shown,) along the vertical diameter of the core. If desired, a magnetic path (not shown), such as path 51' of Fig. 5, may be provided along the vertical diameter; or a magnetic yoke (not shown), such as yoke 51" of Figs. 7 and 8, may be provided for reducing the reluctance of the carrier flux path between the ends of the vertical diameter of core 100; or both of these expedients may be employed. The modulating fluxes due to the four windings are all in the same direction along the core. Thus, the relation between the directions of the carrier and modulating fluxes in the right hand half of ring 100 is opposite to that in the left hand half of the ring. As in the case of Fig. 9, the windings of the modulator all have the same number of turns and are connected as the four arms of a Wheatstone bridge circuit of which one diagonal is the source 3 and the other diagonal is the circuit including the output side of filter 15 and the input side of filter 11 in series. Thus, as in the case of Fig. 9, the same windings serve as carrier current windings and as modulating current and modulated current windings, yet undesired reaction between the carrier current circuit and the modulating and modulated current circuit connected to the modulator is prevented. The modulated flux is in the same direction along the core throughout the ring-shaped path, and the modulated voltages generated in windings 104 and 108 are cumulative and are delivered, by the modulator, in parallel with the modulated voltages generated in windings 105 and 107, these latter voltages also being cumulative.

Any of the balanced modulators of Figs. 4 to 10 may be used instead of the modulator 2 in the system of Fig. 2. However, no carrier current of the frequency of source 3, for use in third order demodulation, can be delivered to filter 11 by the balanced modulator. Therefore, even if the filter 11 be capable of passing such frequency, the third order demodulation can be accomplished only by supplying such frequency to the demodulator otherwise than through the modulator.

What is claimed is:

1. The method of amplifying variations which comprises so combining magnetizing effects of said variations and magnetizing effects of other variations, in a magnetic path, as to produce higher than second order side frequency variations representing greater energy than the first mentioned variations, and non-magnetically demodulating said side frequency variations of relatively great energy.

2. The method which comprises so combining magnetizing effects of one set of variations with magnetizing effects of another set of variations, in a magnetic path, as to produce higher than second order side frequency variations, demodulating the latter variations, and reinforcing the first mentioned variations with variations resulting from said demodulation.

3. Amplifying means comprising the combination with a circuit supplying relatively high frequency variations to be modulated, a circuit supplying relatively low frequency variations to be amplified, a magnetic modulator for so modulating the first mentioned variations with the second mentioned variations as to produce high order side frequency variations representing greater energy than said second mentioned variations, and a magnetic structure and magnetizing winding turns therefor included in said modulator, said circuits including said turns, and non-magnetic means for demodulating said side frequency variations of relatively great energy resulting from said modulation.

4. In combination, a magnetic modulator for producing high order modulation with a given wave, a demodulator for demodulating a high order side frequency resulting from said modulation, to produce a wave of the form of the first mentioned wave, and means for reinforcing said first mentioned wave with said demodulation product.

In witness whereof, I hereunto subscribe my name this 17th day of December A. D., 1926.

EVERETT T. BURTON.